US008256600B2

(12) United States Patent
Reed et al.

(10) Patent No.: US 8,256,600 B2
(45) Date of Patent: Sep. 4, 2012

(54) TORQUE-TRANSMITTING MECHANISM HAVING A COMPACT PISTON AND SPRING ASSEMBLY

(75) Inventors: William S. Reed, Greenfield, IN (US); Douglas Scott Burchett, Indianapolis, IN (US); Rayman Eton Bazilio, Indianapolis, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 516 days.

(21) Appl. No.: 12/537,810

(22) Filed: Aug. 7, 2009

(65) Prior Publication Data

US 2011/0031086 A1     Feb. 10, 2011

(51) Int. Cl.
     *F16D 25/0638*     (2006.01)

(52) U.S. Cl. .............. 192/85.34; 192/85.41; 192/85.44; 192/85.45

(58) Field of Classification Search ............... 192/85.34, 192/85.45, 85.46
See application file for complete search history.

(56) References Cited

U.S. PATENT DOCUMENTS

| | | | | | |
|---|---|---|---|---|---|
| 3,596,537 | A | * | 8/1971 | Koivunen | 475/146 |
| 4,881,628 | A | * | 11/1989 | Yamaguchi | 192/48.618 |
| 5,535,865 | A | * | 7/1996 | Haka et al. | 192/85.34 |
| 5,647,467 | A | * | 7/1997 | Yamauchi | 192/85.41 |
| 6,948,606 | B2 | * | 9/2005 | Ida et al. | 192/85.45 |
| 2005/0263367 | A1 | * | 12/2005 | Kita et al. | 192/85 A |

* cited by examiner

*Primary Examiner* — Rodney Bonck

(57) ABSTRACT

A transmission includes an input member, an output member, four planetary gear sets, a plurality of coupling members and a plurality of torque-transmitting devices. A hydraulic fluid control circuit is provided for controlling the operation of the plurality of torque-transmitting devices. The hydraulic fluid control circuit receives pressurized hydraulic fluid from an off-axis hydraulic fluid pump and has a plurality of fluid passages disposed in the transmission house, input member and other coupling members.

12 Claims, 3 Drawing Sheets

TORQUE-TRANSMITTING MECHANISM HAVING A COMPACT PISTON AND SPRING ASSEMBLY

FIELD

The present invention relates generally to multiple speed transmissions using hydraulic torque-transmitting devices and more particularly to hydraulic torque-transmitting devices having a return spring.

BACKGROUND

The statements in this section merely provide background information related to the present disclosure and may or may not constitute prior art.

A typical multi-speed automatic transmission uses a combination of torque transmitting devices, such as clutches, dog clutches/synchronizers, or brakes, to achieve a plurality of forward and reverse gear or speed ratios. Selection of speed ratios is typically accomplished by a microprocessor transmission control module that employs various vehicle parameters, for example vehicle speed, and various driver input signals, for example accelerator pedal position, to select the appropriate speed ratios. The transmission then actuates or engages a combination of the toque transmitting devices to provide the desired speed ratios.

The torque-transmitting devices can use various actuating techniques and mechanisms for transferring torque from one rotating member to another. One type of torque-transmitting device uses a plurality of rotating plates and a hydraulically actuated piston. The hydraulically actuated piston is moved to an engaged position by application of a hydraulic force on the piston. However, the hydraulically actuated piston requires a regulating force to retract the piston from the engaged position. The regulating force may be provided in various manners, for example, a separate hydraulic circuit may provide another hydraulic force on the piston in order to provide the regulating force. However, hydraulic circuits may increase the size and weight of the transmission. In other applications a mechanical spring may be used to apply the regulating force to the piston. However, in previous designs the mechanical spring assembly limits the overall compact size of a transmission as typically a plurality of torque-transmitting devices are employed in each transmission. Accordingly, there is room in the art for an improved torque-transmitting device that includes a piston actuating assembly that reduces the size of the torque-transmitting device.

SUMMARY

In one aspect of the present disclosure a torque-transmitting mechanism is provided for transmitting torque from one interconnecting member to another interconnecting member. The torque-transmitting mechanism includes a housing, a piston, a plurality of coil springs, a spring retainer, a first retainer ring and a plurality of friction plates. The housing is connectable to the first member and includes a piston chamber including an outer wall, an inner wall radially inboard the outer wall and a ring retainer groove disposed in the outer wall. The piston is disposed in the piston chamber of the housing and includes a base portion and an apply portion. The apply portion is a plurality of projections extended from the base portion. The plurality of coil springs each include a first and a second end, wherein the first end is in contact with the base portion of the piston. The spring retainer has a retainer surface, a plurality of projections and a plurality of slots. Each of the plurality of projections retain the second end of each of the plurality of springs and the plurality of slots are formed to receive the plurality of projections of the apply portion of the piston. The first ring retainer has an outer portion that is disposed in the groove of the outer wall of the piston chamber and an inner portion in contact with the surface of the spring retainer. A plurality of reaction plates is disposed in the housing with the reaction plates are rotatably engaged to the housing. A plurality of friction plates rotatably is engaged to the second member. The piston is actuatable to force the reaction plates against the friction plates to transmit torque from the first member to the second member.

In one example of the present disclosure, the apply portion of the piston is partially corrugated.

In another example of the present disclosure, the apply portion of the piston includes a strengthening rib.

In yet another example of the present disclosure, the slots of the spring retainer include a narrow end and a guide tab disposed at the narrow end.

In yet another example of the present disclosure, the piston further comprises an inner and outer seal disposed on the base portion. The inner seal is compressed between the piston and the inner wall of the piston chamber and the outer seal is compressed between the piston and the outer wall of the piston chamber.

In yet another example of the present disclosure, the piston actuating assembly further includes a cushion plate. The housing further includes a splined portion having a ring retainer groove. The plurality of reaction plates and cushion plate are disposed in the splined portion of the housing.

In yet another example of the present disclosure, the torque-transmitting mechanism further includes a backing plate and a second ring retainer. The backing plate is disposed axially adjacent to the plurality of friction plates. The second ring retainer has an outer portion that is disposed in the groove of the splined portion of the housing and an inner portion in contact with the backing plate.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
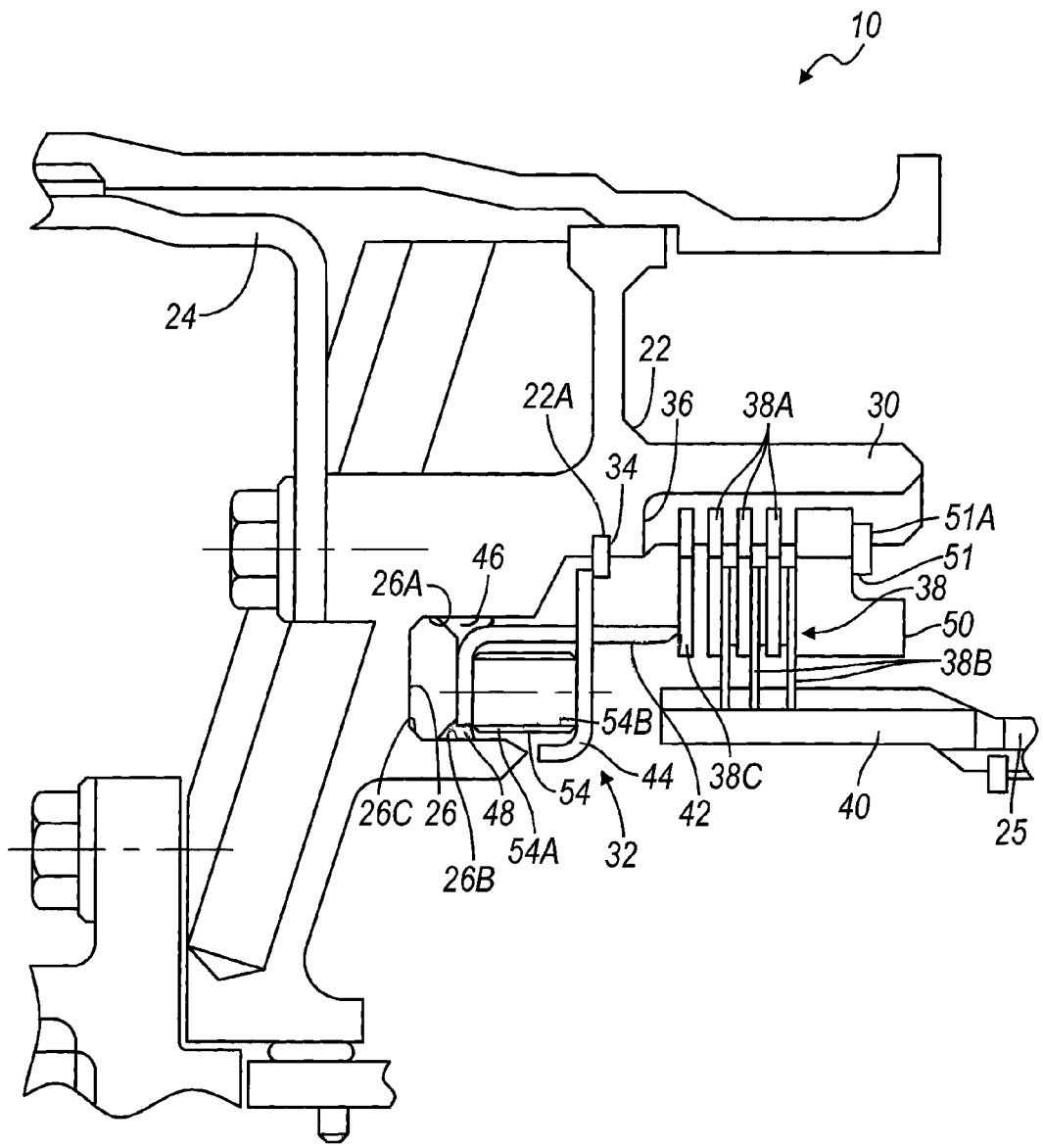
FIG. 1 is a cross-section of a transmission having a torque-transmitting mechanism including an actuating assembly in accordance with an embodiment of the present invention.

Referring to the drawings, wherein like reference numbers refer to like components, in FIG. 1 a cross-sectional view of a transmission 10 and a torque-transmitting device 20 is shown. Some reference numbers are better viewed in FIG. 2 which illustrates an exploded perspective view in accordance with an embodiment of the present invention. The torque-transmitting mechanism 20 is configured to transmit torque from a first interconnecting member 24 to a second interconnecting member 25 of the transmission 10. In one embodiment of the present invention, the interconnecting members 24, 25 are members connecting rotating transmission components to the torque-transmitting device, however, the description also contemplates that the interconnecting members are members of a planetary gear set, shafts or a portion of the transmission housing.

The torque-transmitting mechanism 20 includes a housing 22, an actuating assembly 32, and a set of plates 38. The housing 22 is connectable to the first interconnecting member 24 and includes a piston chamber portion 26 and a splined portion 30. The piston chamber portion 26 is defined by an outer wall 26A, an inner wall 26B and a back wall 26C. The inner wall 26B is formed radially inward from the outer wall 26A and the back wall 26C is adjacent each of the inner and outer walls 26A-B. The splined portion 30, better viewed in FIG. 2, extends from the outer wall 26A of the piston chamber portion 26. The splined portion 30 has a splined inner surface 30A designed to engage the set of plates 38.

The actuating assembly 32 is disposed predominantly in the piston chamber portion 26 of the housing 22. The actuating assembly 32 includes a piston 42, a spring retainer 44 and a plurality of coil springs 54. For example, the plurality of coil springs 54 are disposed between the spring retainer 44 and the piston 42. The coil springs 54 have a first end 54A in contact with the piston 42 and second end 54B in contact with the spring retainer 44. The spring retainer 44 is grounded to the housing 22 to prevent relative axial movement between the spring retainer 44 and the housing 22. The outer wall 26C of the housing includes a groove 22A. The actuating assembly 32 is restricted from moving axially by a ring retainer 34 disposed in the groove 22A. The piston 42 is disposed in the piston chamber portion 26 of the housing 22. The piston 42 has an outer and inner seal 46, 48 that contact the outer and inner wall 26C, 26B of the piston chamber portion 26, respectively. The piston 42 and seals 46, 48 enclose the piston chamber portion 26 and establish a leak-resistant seal required for selective hydraulic pressurization of the piston chamber portion 26.

Figure 2:
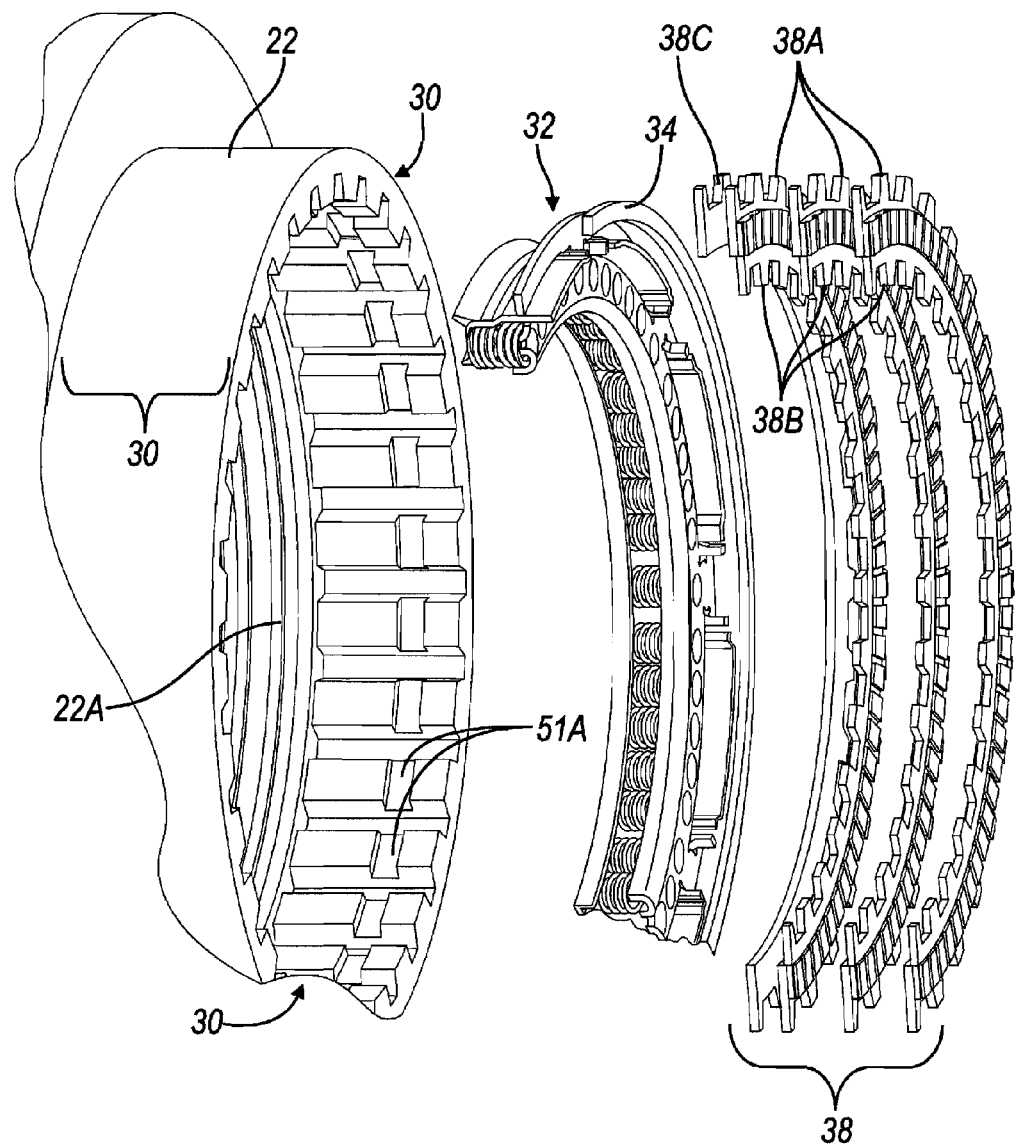
FIG. 2 is a perspective and exploded view of a torque-transmitting mechanism in accordance with an embodiment of the present invention.

The set of plates 38, better viewed in FIG. 2, have alternatively stacked reaction plates 38A, friction plates 38B and a cushion plate 38C. The outer diameter splined reaction plates 38A engage with the splines 30A of the splined portion 30 and the inner diameter splined friction plates 38B engage with a splined portion 25A of the second interconnecting member 25.

The piston 42 is aligned to contact cushion plate 38C of the set of friction plates 38. Upon pressurization of the piston chamber portion 26, the hydraulic pressure acts on the piston 42 moving the piston 42 axially toward the cushion plate 38C and thus transferring the pressure to the set of plates 38. A backing plate 50 is retained in the splined portion 20 of the housing 22 by a ring retainer 51 that is disposed partially in a groove 51A, better viewed in FIG. 2, in the splined portion 30. The backing plate 50 constrains the plates 38 from moving axially. The plates 38 are compressed together creating friction to restrict relative movement between the reaction plates 38A and the friction plates 38B and as a result, between the first and second interconnecting members 24, 25.

Figure 3:
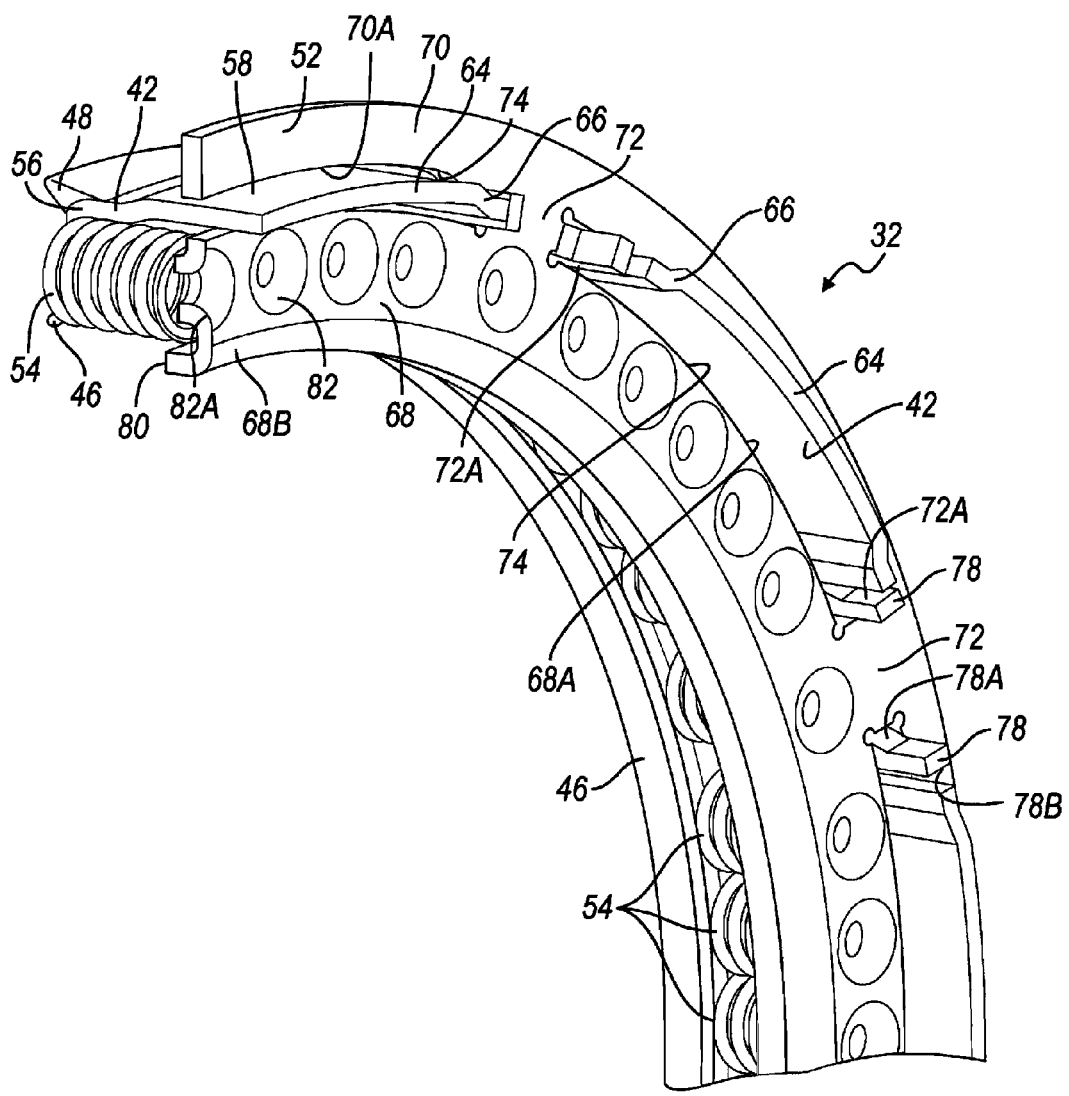
FIG. 3 is a perspective view of an actuation assembly in accordance with an embodiment of the present invention.

Referring now to FIG. 3, a perspective view of the actuating assembly 32 is illustrated and will now be described. The actuating assembly 32 includes the piston 42, a spring retainer 52 and a plurality of coil springs 54. The piston 42 further includes a base portion 56 and an apply portion 58. The base portion 56 contacts each of the outer and inner walls 26A, 26B of the piston chamber portion 26 (shown in FIG. 1) forming a pressurized hydraulic seal. The apply portion 58 of the piston includes a plurality of projections 64 that lengthen selected portions of the base portion 56 of the piston 42. In the example provided, the projections 64 are equally spaced around the perimeter of the piston 42. Additionally, corrugations 66 are formed in the projections 64 to provide additional strength and rigidity although other methods, such as ribs (not shown) may be utilized to achieve such an effect.

The spring retainer 52 includes an inner portion 68 and an outer portion 70 that are connected by a plurality of connective portions 72. The connective portions 72 are disposed at equal distances along the perimeter between the inner and outer portions 68, 70. A plurality of slots 74 are formed by an outer edge 68A of the inner portion 68, an inner edge 70A of the outer portion 70, and the side edges 72A of each adjacent connective portion 72. The slots 74 provide clearance for the projections 64 of the piston 42 to pass through the spring retainer 52. A tab 78 is formed at each of the side edges 72A of the connective portions 72. The tabs 78 include a corner radius 78A and an inner surface 78B to help guide the projections 64 through the slots 68 of the spring retainer 52.

The inner portion 68 of the spring retainer 52 includes a rim 80 and a plurality of spring indentations 82. The rim 80 is formed along the inner edge 68B of the inner portion 68 and at least partially encloses the plurality of springs 54. The spring indentations 82 each include a spherical raised portion 82A. The spring indentations 82 have a same or slightly smaller diameter than the inner diameter of the springs 54. The springs 54 are disposed between the piston 42 and the spring retainer 52 so that the raised portion 82A of the spring indentations 82 pass at least partially through the inside diameter of the springs 54. The piston 44, rim 80 and plurality of spring indentations 82 cooperate to retain the springs 54. The springs 54 are oriented so that the compressed forces of the springs 54 act to oppose the piston 42 and the spring retainer 52. The combined force of the springs 54 offsets the force applied to the piston 42 as the hydraulic pressure in the piston chamber portion 26 is relieved.

The description of the invention is merely exemplary in nature and variations that do not depart from the gist of the invention are intended to be within the scope of the invention. Such variations are not to be regarded as a departure from the spirit and scope of the invention.

What is claimed is:

1. A torque-transmitting mechanism for transmitting torque from a first member to a second member, the torque-transmitting mechanism comprising:

a housing connectable to the first member, the housing having a piston chamber including an outer wall, an inner wall radially inboard of the outer wall and a ring retainer groove disposed in the outer wall;

a piston disposed in the piston chamber of the housing, the piston having a base portion and an apply portion wherein the apply portion is includes a plurality of piston projections extended from the base portion;

a plurality of coil springs each having a first and a second end, wherein the first end is in contact with the base portion of the piston;

a spring retainer having a retainer surface, a plurality of retainer projections and a plurality of slots, wherein each of the plurality of retainer projections retain the second end of each of the plurality of springs, the plurality of slots are formed to receive the plurality of piston projections of the apply portion of the piston, and the plurality of slots each include a narrow end and a guide tab disposed at the narrow end;

a first ring retainer having an outer portion that is disposed in the groove of the outer wall of the piston chamber and an inner portion in contact with the surface of the spring retainer; and a plurality of reaction plates disposed in the housing, wherein the reaction plates are rotatably engaged to the housing;

a plurality of friction plates rotatably engaged to the second member, and wherein the piston is actuatable to force the reaction plates against the friction plates to transmit torque from the first member to the second member.

2. The torque-transmitting mechanism of claim 1 wherein the apply portion of the piston is partially corrugated.

3. The torque-transmitting mechanism of claim 1 wherein the apply portion of the piston includes a strengthening rib.

4. The torque-transmitting mechanism of claim 1 wherein the piston further comprises an inner and outer seal disposed on the base portion, wherein the inner seal is compressed between the piston and the inner wall of the piston chamber and the outer seal is compressed between the piston and the outer wall of the piston chamber.

5. The torque-transmitting mechanism of claim 1 further comprising a cushion plate, wherein the housing further includes a splined portion having a ring retainer groove, and wherein the plurality of reaction plates and cushion plate are disposed in the splined portion of the housing.

6. The torque-transmitting mechanism of claim 1 further comprising a backing plate and a second ring retainer, the backing plate disposed axially adjacent to the plurality of friction plates, the second ring retainer having an outer portion that is disposed in a groove of a splined portion of the housing and an inner portion in contact with the backing plate.

7. A torque-transmitting mechanism for transmitting torque from a first member to a second member, the torque-transmitting mechanism comprising:

a housing connectable to the first member, the housing having a splined portion and a piston chamber, wherein the splined portion includes a ring retainer groove and the piston chamber includes an outer wall, an inner wall radially inboard the outer wall and a ring retainer groove disposed in the outer wall;

a piston disposed in the piston chamber of the housing, the piston having a base portion and an apply portion wherein the apply portion includes a plurality of piston projections extended from the base portion;

a plurality of coil springs each having a first and a second end, wherein the first end is in contact with the base portion of the piston;

a spring retainer having a retainer surface, a plurality of retainer projections and a plurality of slots, wherein each of the plurality of retainer projections retain the second end of each of the plurality of coil, the plurality of slots are formed to receive the plurality of piston projections of the apply portion of the piston, and the plurality of slots each include a narrow end and a guide tab disposed at the narrow end;

a first ring retainer having an outer portion that is disposed in the groove of the outer wall of the piston chamber and an inner portion in contact with the surface of the spring retainer;

a plurality of reaction plates disposed in the housing, wherein the reaction plates are rotatably engaged to the housing;

a plurality of friction plates rotatably engaged to the second member, and a backing plate and a second ring retainer, wherein the backing plate is disposed axially adjacent to the plurality of friction plates and the second ring retainer has an outer portion disposed in the groove of the splined portion of the housing and an inner portion in contact with the backing plate, and wherein the piston is actuatable to force the reaction plates against the friction plates to transmit torque from the first member to the second member.

8. The torque-transmitting mechanism of claim 7 wherein the apply portion of the piston is partially corrugated.

9. The torque-transmitting mechanism of claim 7 wherein the apply portion of the piston includes a strengthening rib.

10. The torque-transmitting mechanism of claim 7 wherein the piston further comprises an inner and outer seal disposed on the base portion, wherein the inner seal is compressed between the piston and the inner wall of the piston chamber and the outer seal is compressed between the piston and the outer wall of the piston chamber.

11. A torque-transmitting mechanism for transmitting torque from a first member to a second member, the torque-transmitting mechanism comprising:

a housing connectable to the first member, the housing having a splined portion and a piston chamber, wherein the splined portion includes a ring retainer groove and the piston chamber includes an outer wall, an inner wall radially inboard the outer wall and a ring retainer groove disposed in the outer wall;

a piston disposed in the piston chamber of the housing, the piston having a base portion and an apply portion wherein the apply portion includes a plurality of piston projections extended from the base portion and is partially corrugated;

a plurality of coil springs each having a first and a second end, wherein the first end is in contact with the base portion of the piston;

a spring retainer having a retainer surface, a plurality of retainer projections and a plurality of slots, wherein each of the plurality of retainer projections retain the second end of each of the plurality of springs and the plurality of slots include a narrow end and a guide tab disposed at the narrow end and are formed to receive the plurality of piston projections;

a first ring retainer having an outer portion that is disposed in the groove of the outer wall of the piston chamber and an inner portion in contact with the surface of the spring retainer;

a plurality of reaction plates disposed in the housing, wherein the reaction plates are rotatably engaged to the housing;

a plurality of friction plates rotatably engaged to the second member, and a backing plate and a second ring retainer, wherein the backing plate is disposed axially adjacent to the plurality of friction plates and the second ring retainer has an outer portion disposed in the groove of the splined portion of the housing and an inner portion in contact with the backing plate, and wherein the piston is actuatable to force the reaction plates against the friction plates to transmit torque from the first member to the second member.

12. The torque-transmitting mechanism of claim 11 wherein the piston further comprises an inner and outer seal disposed on the base portion, wherein the inner seal is compressed between the piston and the inner wall of the piston chamber and the outer seal is compressed between the piston and the outer wall of the piston chamber.

* * * * *